US008909955B2

(12) United States Patent
Abdelsamie et al.

(10) Patent No.: US 8,909,955 B2
(45) Date of Patent: Dec. 9, 2014

(54) METHOD AND APPARATUS FOR PROVIDING CHARACTERISTICS INFORMATION OF A PERIPHERAL DEVICE TO AN ELECTRONIC DEVICE BY ENCODING THE CHARACTERISTIC INFORMATION INTO A POWER SIGNAL

(75) Inventors: Ahmed Abdelsamie, Napean (CA); Antoine Boucher, Kitchener (CA); Marc Élis Meunier, Kitchener (CA); Sushil K. Verma, Richmond Hill (CA); John Ivan Scharkov, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 420 days.

(21) Appl. No.: 13/177,942

(22) Filed: Jul. 7, 2011

(65) Prior Publication Data

US 2013/0013938 A1    Jan. 10, 2013

(51) Int. Cl.
*G06F 1/00*    (2006.01)
*G06F 1/26*    (2006.01)
*G06F 1/16*    (2006.01)

(52) U.S. Cl.
CPC .......... *G06F 1/26* (2013.01); *G06F 2221/2111* (2013.01); *G06F 1/1632* (2013.01)
USPC ....................................... 713/310

(58) Field of Classification Search
CPC ....................... G06F 1/1632; G06F 2221/2111
USPC .......................................... 713/310; 439/173
See application file for complete search history.

(56) References Cited

U.S. PATENT DOCUMENTS

| | | | |
|---|---|---|---|
| 5,859,522 | A | 1/1999 | Theobald |
| 5,932,989 | A | 8/1999 | Thandiwe et al. |
| 6,665,803 | B2 | 12/2003 | Lunsford et al. |
| 7,343,147 | B2 | 3/2008 | Ruff et al. |
| 7,565,458 | B2 | 7/2009 | Thijssen et al. |
| 7,840,740 | B2 | 11/2010 | Minoo |
| 7,949,802 | B2 | 5/2011 | Gallant et al. |
| 8,073,499 | B2 | 12/2011 | Ruff et al. |

(Continued)

FOREIGN PATENT DOCUMENTS

| | | |
|---|---|---|
| CA | 2367770 A1 | 11/2000 |
| CA | 2779909 A1 | 1/2013 |

(Continued)

OTHER PUBLICATIONS

Extended European search report, European patent application No. 11173164.2, dated Dec. 5, 2011.

(Continued)

*Primary Examiner* — Mohammed Rehman
*Assistant Examiner* — Xuxing Cheng
(74) *Attorney, Agent, or Firm* — Bereskin & Parr LLP/S.E.N.C.R.K., s.r.l.

(57) ABSTRACT

Various embodiments are described herein for a peripheral device and a method of identifying the peripheral device via power cycling. In one embodiment, the method comprises obtaining characteristic information about the peripheral device, encoding the characteristic information in a power signal at the peripheral device and sending the power signal to an electronic device that is operably connected with the peripheral device. The electronic device can then take action such as adjusting its settings or applications based on the characteristic information of the peripheral device.

22 Claims, 9 Drawing Sheets

(56) References Cited

U.S. PATENT DOCUMENTS

| | | | |
|---|---|---|---|
| 8,139,353 B2 * | 3/2012 | Slaby et al. | 361/679.41 |
| 2002/0086703 A1 * | 7/2002 | Dimenstein et al. | 455/557 |
| 2002/0119800 A1 * | 8/2002 | Jaggers et al. | 455/550 |
| 2004/0179135 A1 | 9/2004 | Battles et al. | |
| 2005/0268000 A1 | 12/2005 | Carlson | |
| 2008/0258679 A1 | 10/2008 | Manico et al. | |
| 2009/0001932 A1 | 1/2009 | Kamijo et al. | |
| 2010/0070659 A1 | 3/2010 | Ma et al. | |
| 2010/0081473 A1 | 4/2010 | Chatterjee et al. | |
| 2010/0085701 A1 * | 4/2010 | Nielsen et al. | 361/679.43 |
| 2011/0162035 A1 * | 6/2011 | King et al. | 726/1 |

FOREIGN PATENT DOCUMENTS

| | | |
|---|---|---|
| CN | 102118472 A | 7/2011 |
| EP | 2544330 A1 | 1/2013 |
| EP | 2544330 B1 | 9/2014 |

OTHER PUBLICATIONS

Extended European search report Response, European patent application No. 11173164.2, dated Mar. 6, 2012.

Document relating to EP Application No. 11173164.2, dated Mar. 31, 2014 (Communication under Rule 71(3)—Intention to grant).

Document relating to CA Application No. 2,779,909, dated May 1, 2014 (Office Action).

Document relating to EP Application No. 11173164.2, dated Aug. 14, 2014 (Decision to Grant).

Document relating to EP Application No. 11173164.2, dated Sep. 11, 2014 (Certificate for European Patent).

Document relating to CA Application No. 2,779,909, dated Oct. 29, 2014 (Response).

\* cited by examiner

METHOD AND APPARATUS FOR PROVIDING CHARACTERISTICS INFORMATION OF A PERIPHERAL DEVICE TO AN ELECTRONIC DEVICE BY ENCODING THE CHARACTERISTIC INFORMATION INTO A POWER SIGNAL

FIELD

The various embodiments described herein generally relate to a method and system for identifying a peripheral device that is connected to an electronic device.

BACKGROUND

The use of electronic devices is very pervasive in today's society as electronic devices are used in many different locations. In fact, the same electronic device, such as a mobile device like a cell phone, smart phone or laptop, can be used in many different locations such as the office, at home or in a vehicle. However, these electronic devices are used differently in these different locations. For example, a mobile device user may use certain applications on the device such as a clock application while at home and use a text to speech application while travelling in a vehicle. Accordingly, it would be useful if electronic devices can determine their environment and automatically execute certain applications based on user preferences.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
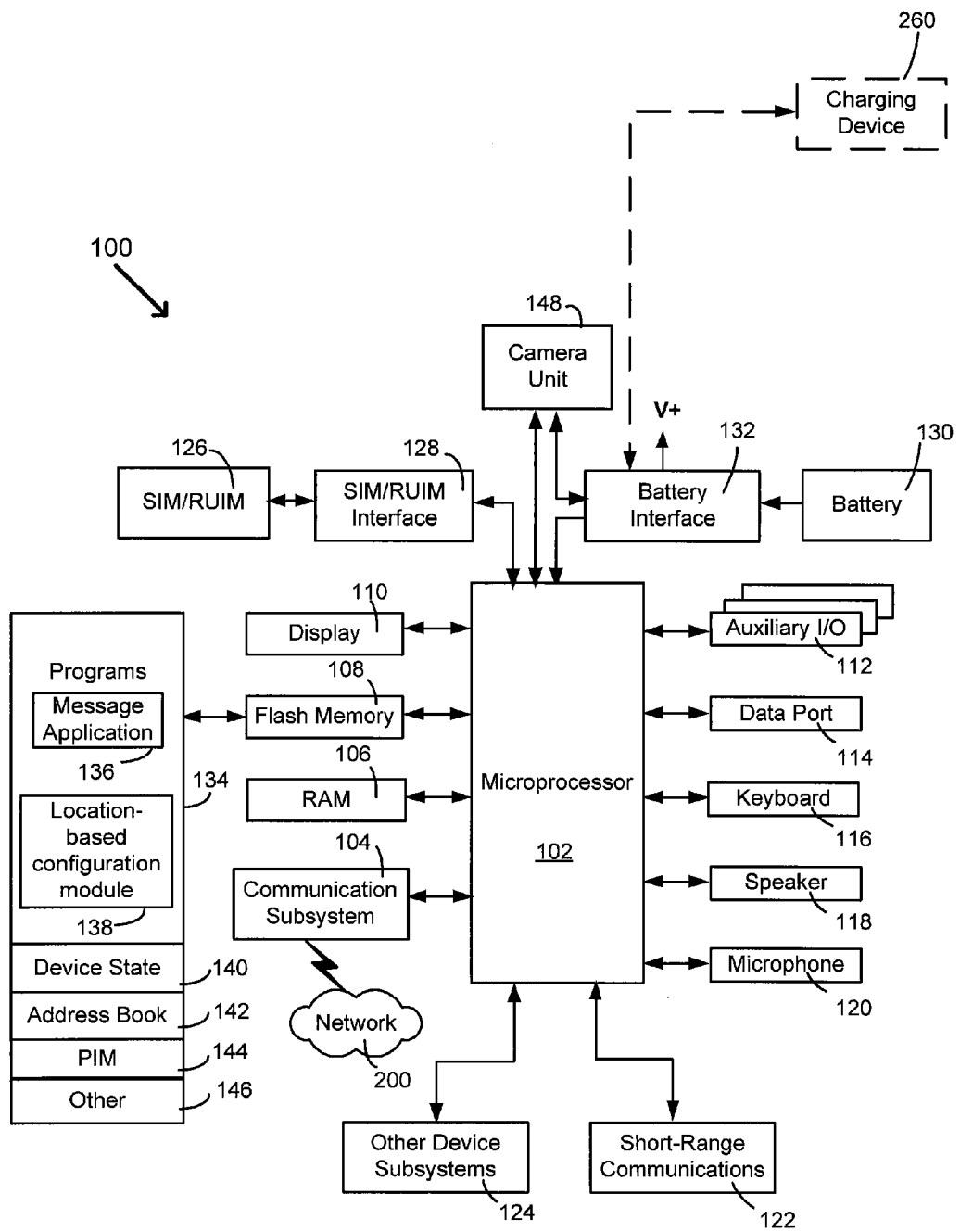
FIG. 1 is a block diagram of a mobile device in one example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The detailed description begins with a general description of a mobile device that operates with a peripheral device such that the mobile device can determine its location to configure its operation, and then proceeds to describe example embodiments of a charging method and a charging device which provides location information to the mobile device during operation. In general, as used herein, the term "peripheral device" is any device that can convey or supply power to a mobile device or stationary device. The power may be conveyed or otherwise sent by, for example, conductor-to-conductor contact or by electromagnetic induction (although for purposes of simplicity, direct conductor contact will be assumed). Also, for purposes of simplicity, the peripheral device may be illustrated as a charging device, although the peripheral device may have other functions as well.

To aid the reader in understanding the structure of the mobile device, reference will be made to FIGS. 1 to 3. However, it should be understood that the embodiments described herein are not limited to a mobile device but can be extended to any electronic device. Examples of such electronic devices generally include any electronic device that requires charging such as cellular phones, cellular smart-phones, wireless organizers, personal digital assistants, computers, laptops, handheld wireless communication devices, wireless enabled notebook computers, tablet computers or e-readers, electronic security devices, wireless Internet appliances and the like.

Referring to FIG. 1, shown therein is a block diagram of one example of a mobile device 100. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this example, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiment described herein is intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in this example, other wireless networks can also be associated with the mobile device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries in a battery unit 130. The battery interface 132 is coupled to a regulator (not shown), which assists the battery unit 130 in providing power V+ to the mobile device 100. Alternatively, the battery unit 130 can be a smart battery as is known in the art. Smart batteries generally include a battery processor, battery memory, switching and protection circuitry, measurement circuitry and a battery pack that includes one or more batteries, which are generally rechargeable. In either case, the one or more batteries in the battery unit 130 can be made from lithium, nickel-cadmium, lithium-ion, or other suitable composite material.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture. When the microprocessor 102 is executing any of the software applications 134, the microprocessor 102 can be considered to be configured to execute a number of steps according to the methods specified by the code of the software applications 134.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative embodiment, all messages can be stored in a remote location while only recent messages can be stored on the mobile device 100.

The mobile device 100 further includes a location-based configuration module 138, a device state module 140, an address book 142, a Personal Information Manager (PIM) 144, and other modules 146. The location-based configuration module 138 is used to configure the mobile device 100 to operate in a certain manner based on the location of the mobile device 100. As will be described below, information about a peripheral device (what may be generally called characteristic information) may be sent to the mobile device 100, indicating or otherwise being representative of the current location, as well as possibly other information, of the peripheral device which in turn indicates information about the mobile device 100 (such as location, a mode of operation, and the like). This allows the mobile device 100 to automatically run some application or configure some settings that are related to its current location. For example, the configuration module 138 can alter the display 110 of the mobile device 100 and run some applications that are related to the location of the mobile device 100. For example, if the mobile device 100 is near the bedside of the user, the location-based configuration module 138 can configure the mobile device 100 to show at least one of a display of the current time, current day, current date, and an alarm time. In another instance, when the mobile device 100 is being used in a vehicle, the location-based configuration module 138 can configure the mobile device 100 to execute at least one of a map application, a speakerphone function for phone calls and a text-to-speech application to convert incoming electronic messages to speech or read the user's calendar to the user. In addition, or in an alternative, a GPS program may also be executed with audio and visual navigation and/or a traffic application may be executed to provide traffic messages. In another example, when the mobile device 100 is being used in the office, the location-based configuration module 138 can configure the mobile device 100 to execute a calendar application, an email program, a data enterprise server application or a Bluetooth connection. There may also be settings that can be configured based on the location of the mobile device 100. For instance, in at least some embodiments, there can be an application that allows the user to specify a theme/user interface configuration; for example, the application can allow the user to select a particular photo or wallpaper that can be used for the background of the display 110 or the screen-saver based on the location of the mobile device 100. Other possible settings include volume control, brightness of the backlighting of the display 110, font-size and the like. It should be noted that these examples are provided for illustrative purposes and are not meant to be exhaustive or limiting. In each of these circumstances, the location-based configuration module 138 can determine the location of the mobile device 100 by interacting with a charging device, which is described in more detail with respect to FIGS. 5 to 10c.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 can also include a camera unit 148 that allows a user of the mobile device 100 to take pictures. The camera unit 148 can have various structures as is known to those skilled in the art. In use, the camera unit 148 receives an activation signal from the microprocessor 102 when a user selects the camera mode for the mobile device 100. The camera unit 148 then determines the required camera flash current based on the magnitude of light that needs to be produced by the camera flash for the current physical surroundings of the mobile device 100 so that a good quality picture is taken of the scene; in this regard various techniques known to those skilled in the art can be employed. The camera unit 148 continuously takes pictures of the scene that are then displayed as images on the display 110. When the user selects an image that they wish to capture, the selected image is saved by the microprocessor 102 in an appropriate memory element, such as the flash memory 108.

Figure 2:
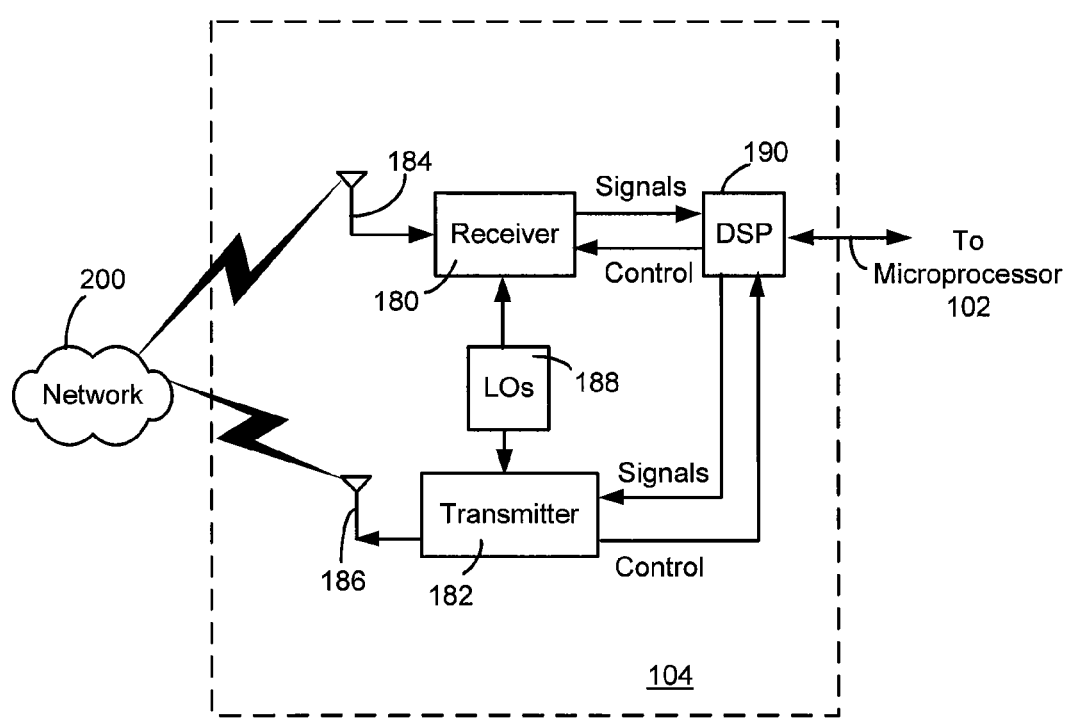
FIG. 2 is a block diagram of an example embodiment of a communication subsystem component of the mobile device of FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184, 186, Local Oscillators (LOs) 188, and a processing module such as a Digital Signal Processor (DSP) 190.

The particular design of the communication subsystem 104 is dependent upon the network 200 in which the mobile device 100 is intended to operate; thus, it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (ND) conversion. ND conversion of a received signal allows more complex communication techniques such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when it is sending to the network 200 and is otherwise turned off to conserve resources. Similarly, the receiver 180 is periodically turned off to conserve power until it is needed to receive signals or information (if at all) during designated time periods.

Figure 3:
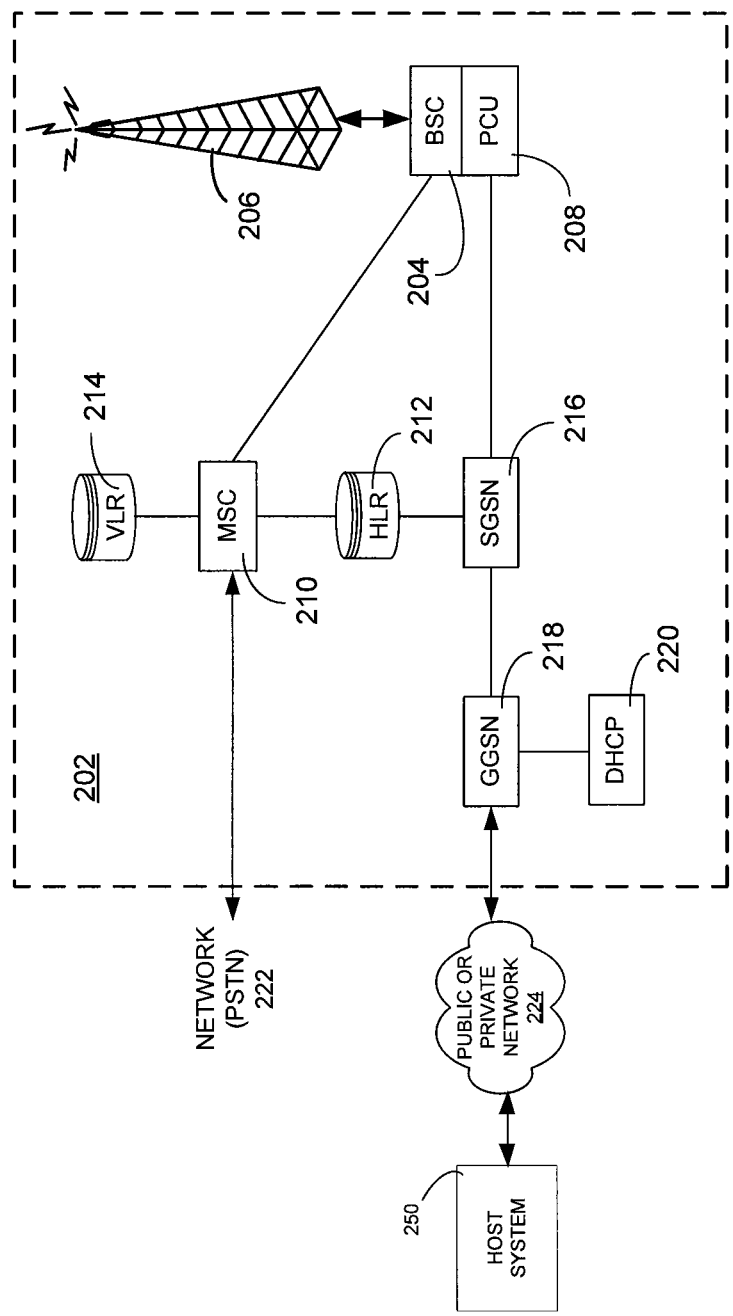
FIG. 3 is a block diagram of a node of a wireless network in one example embodiment.

Referring now to FIG. 3, a block diagram of a node of a wireless network is shown as 202. In practice, the network 200 comprises one or more nodes 202. The mobile device 100 communicates with a node 202 within the wireless network 200. In the example embodiment of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be deallocated and the IP address returned to the IP address pool managed by the DHCP server 220.

Figure 4A:
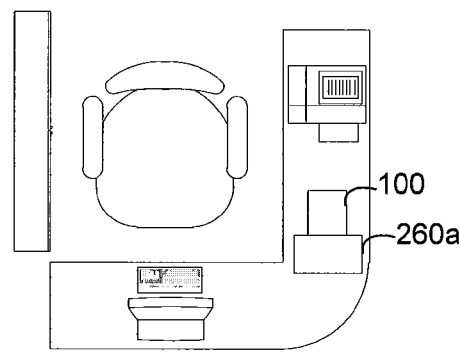
FIGS. 4a-4c show illustrations of a charging device charging the mobile device in an office location, vehicle location and home location respectively.
Figure 4B:
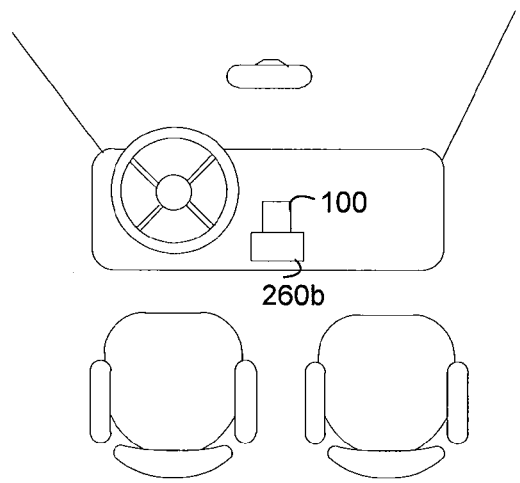
Figure 4C:
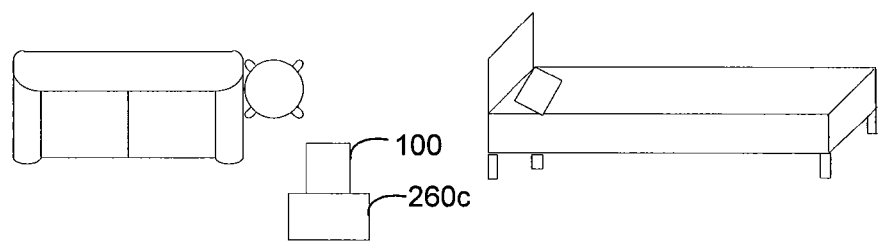

As previously mentioned, the location-based configuration module 138 can be used to configure the operation of the mobile device 100 based on its location such as, but not limited to, an office (FIG. 4*a*), a vehicle (FIG. 4*b*) or a home (FIG. 4*c*). In each of these instances, the mobile device 100 is typically being charged by different charging devices 260*a*, 260*b* and 260*c* respectively that connect with the battery interface 132. Accordingly, the charging devices 260*a*, 260*b* and 260*c* can have a location-based ID that is specified by the user of the mobile device 100 and communicated to the mobile device 100 during use. The location-based configuration module 138 then configures the operation of the mobile device 100 based on location-based settings that are pre-specified for that particular location of the mobile device 100. The mobile device 100 can be pre-programmed during manufacture such that certain default applications are associated with certain locations. Alternatively, or in addition, during use, the location-based configuration module 138 can receive instructions from the user of the mobile device 100 as to which applications are to be automatically executed when the mobile device 100 is in a certain location. Accordingly, the location-based configuration module 138 can allow a user to overwrite the default or manufacturer-based settings and specify preferred applications.

However, one particular challenge is that the connection between the charging device 260 and the mobile device 100 does not always include data lines. For example, the connection between the charging device 260 and the mobile device may be through exposed power connection points including only the positive voltage supply and ground lines. Accordingly, there are no data lines that can be used to communicate information between the charging device 260 and the mobile device 100. However, this challenge is overcome since the mobile device 100 and the charging device 260 described herein can communicate through a power signal that is transferred between the charging device 260 and the mobile device 100. This technique can also be applied to connections which include data lines as long as the connections also include power or voltage supply lines. In other words, a power signal may, instead of or in addition to supplying power, encode characteristic information about a peripheral device (which may indicate the location of the peripheral device and in turn the location of the mobile device 100). It should also be noted that the terms "connected" or "connection", as used herein, are not meant to be limited to a straight connection between a first element and a second element as there may be some cases in which there is an intermediate element between the first and second elements.

Figures 5, 6:
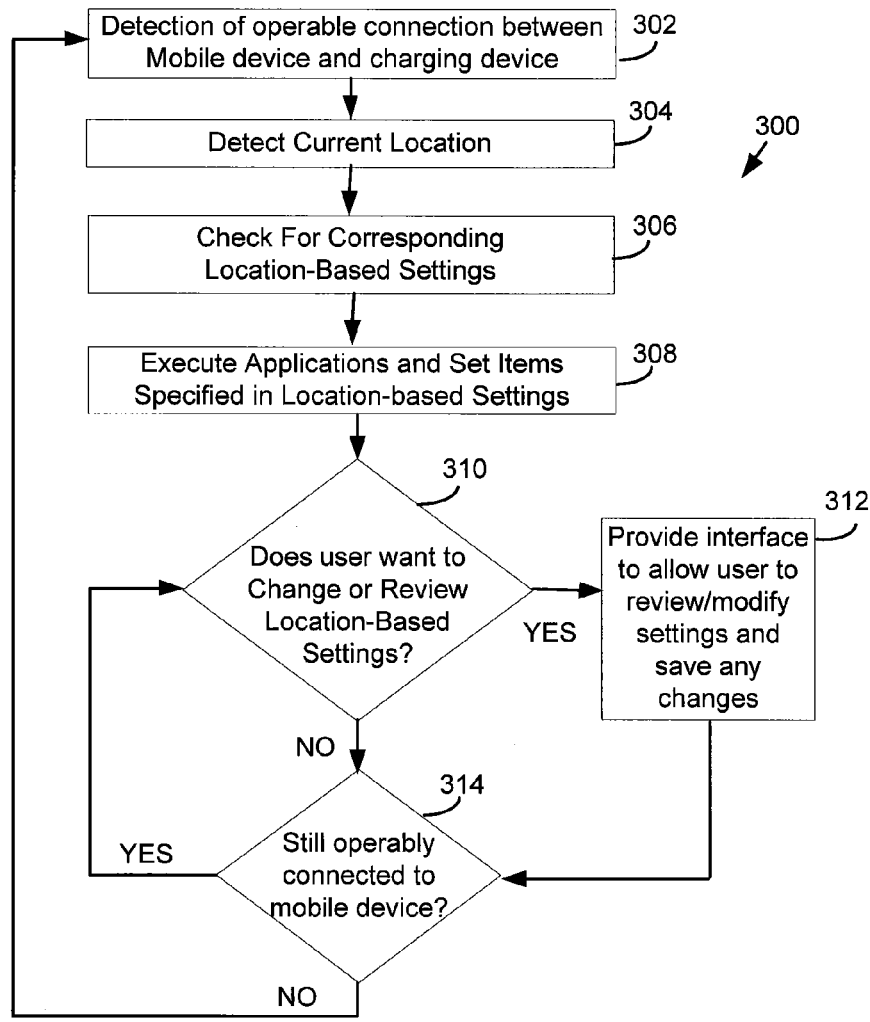
FIG. 5 is a flowchart of an operational method followed by a component of the mobile device in configuring the operation of the mobile device based on its location.
FIG. 6 is an illustration of a database that is used in configuring the operation of the mobile device based on its location.

Referring now to FIG. 5, shown therein is a flowchart of an operational method 300 followed by the location-based configuration module 138. At step 302, the location-based configuration module 138 detects whether the charging device 260 is operably connected to the mobile device 100. This can be done by monitoring the voltage signal through the battery interface 132 that is provided by the pins through which the charging device 260 would be connected to in order to provide the power signal. The existence of a certain voltage level that corresponds to a charging level, such as 5 V for example, for a certain time period, such as 50 ms for example, would indicate that the charging device 260 has just been connected to the mobile device 100 and is about to send the location information to the mobile device 100. If a connection between the mobile device 100 and the charging device 260 is detected, the method 300 moves to step 304; otherwise the method 300 remains at step 302 until this connection is detected.

At step 304, the location-based configuration module 138 detects the current location of the mobile device 100 based on location information that is provided by the charging device 260. The new location can be stored as the value of a current location variable in memory 106 or 108 of the mobile device 100. If the current location cannot be detected, then the location-based configuration module 138 can assume that the mobile device 100 is in the previously detected location. In an alternative, if the current location cannot be detected, the location-based configuration module 138 can assume the mobile device 100 is in a default location, and runs applications and configures settings on the mobile device 100 that are associated with the default location.

At step 306, the location-based configuration module 138 then checks for the corresponding location-based settings in memory. These settings include applications that are to be executed on the mobile device 100 as well as values for various items for the mobile device 100 that are associated with its current location; some examples of which were previously described.

The applications and items that correspond with the location can be stored in a location-based settings database 350 (as shown in FIG. 6 for example) in the flash memory 108. The location-based settings database 350 includes a location ID field 352, a location-based applications field 354 and a location-based items field 356. The location ID field 352 includes records 352*a* to 352*n* for keeping track of n different locations that can be associated with up to n different charging devices. The applications and values for other items that are associated with the n different locations are stored in corresponding records 354*a* to 354*n* and 356*a* to 356*n*. In other embodiments, additional fields can be included in the location-based settings database 350.

At step 308, the location-based configuration module 138 then instructs the microprocessor 102 to execute the applications and adjust device settings based on the items that are specified in the location-based settings. However, if no location-based settings are found at step 306 that correspond to the current location, then the operation of the mobile device 100 can be modified to operate based on its default location settings.

At step 310, the location-based configuration module 138 then checks to see if it has received a request from the user to make any changes to the location-based settings. This would occur when the user requests that a location-based settings configuration application be executed in which case a graphical user interface would be provided at step 312 to allow the user to check the current location-based settings that are set for various locations and to make any desired changes. If changes are made then the location-based configuration module 138 saves these new settings in the flash memory 108. These new settings can be additional to those that are already in memory for a particular location, can be new settings that are used to overwrite the current settings in memory for a particular location, or can be new settings that are associated with a new location that are to be stored in memory.

The method 300 then proceeds to step 314 at which point the location-based configuration module 138 determines if the mobile device 100 is still connected to the charging device 260. If step 314 is true, the method 300 proceeds to step 310 and cycles through monitoring whether the user wishes to make changes to the location-based settings and whether the mobile device 100 and the charging device 260 are still connected. If step 314 is false, then the method 300 moves to step 302 to determine the next time that the mobile device is operably connected to the charging device 260. It should be noted that two elements which are operably connected to one another need not be physically connected to one another or proximate to one another, but rather can be any connection, including electromagnetic, such that a change in one element effects a change in another element.

Figure 7:
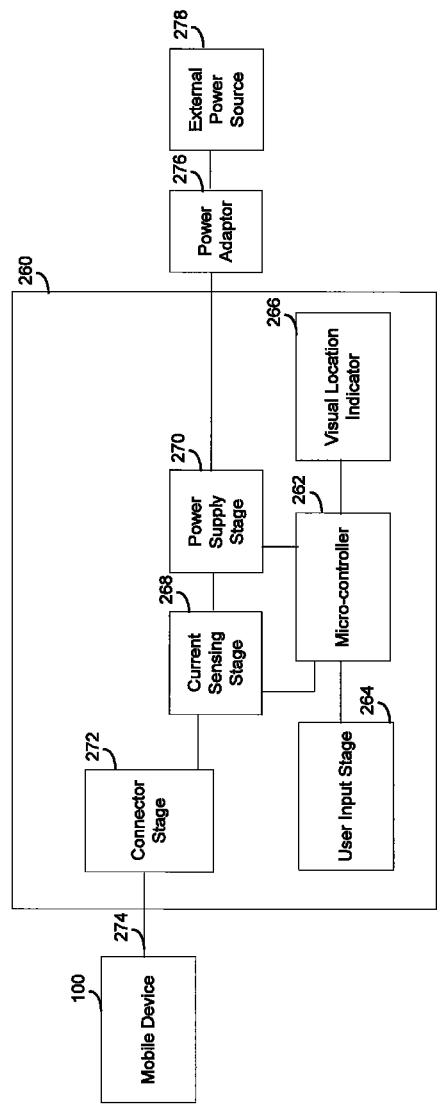
FIG. 7 is a block diagram of an example embodiment of a charging device.

Referring now to FIG. 7, shown therein is an example embodiment of the charging device 260. The charging device 260 includes a micro-controller 262, a user input stage 264, a visual location indicator 266, a current sensing stage 268, a power supply stage 270 and a connector stage 272. The charging device 260 is releasably connectable to the mobile device 100 through connection 274, which is described in more detail below. The charging device 260 can also be referred to as a cradle in some cases.

The micro-controller 262 controls the operation of the charging device 260. The micro-controller 262 can be any micro-processor that is suitable for use in a charging device 260 as known to those skilled in the art. The micro-controller 262 receives user input (a location select signal) through the user input stage 264 to set a location characteristic for the charging device 260 that corresponds to the location in which the user of the mobile device 100 is likely to use the charging device 260. This location characteristic can be changed by the user over time through interaction with the user input stage 264. A default location characteristic can be set for the charging device 260 during manufacturing and then changed afterwards during use by the user of the mobile device. The micro-controller 262 will then send a location indication signal to the visual location indicator 266 which then provides a visual indication to the user of the value of the location characteristic that has been set for the charging device 260. The micro-controller 262 can have permanent memory that stores the value of the location characteristic. Alternatively, each time the charging device 260 is connected to a power source, the micro-controller 262 can determine the value of the location characteristic from the user input stage 264 and store this value in temporary memory such as a register.

The micro-controller 262 receives a current sense signal from the current sensing stage 268 which allows the micro-controller 262 to determine whether the charging device 260 is connected to the mobile device 100. When an operable connection between the charging device 260 and the mobile device 100 is detected, the micro-controller 262 sends a location control signal to the power supply stage 270 to encode the location characteristic in the power supply signal that is provided by the power supply stage 270 and sent to the connector stage 272.

The user input stage 264 is connected to the micro-controller and allows the user to set a value for the location characteristic of the charging device 260. Various mechanical elements can be used to implement the user input stage 264. For example, the user input stage 264 can be a push-button that the user can push a certain number of times to associate a location with the charging device 260. For instance, one push can be associated with a home location, two pushes with an office location and three pushes with a vehicle location. Accordingly, the micro-controller 262 counts the number of pushes in a given time period to determine the location assigned by the user to the charging device 260. In an alternative embodiment, the user input stage 264 can be a rotary switch or dial switch that has several settings corresponding to several different possible locations that the user can select from to set the location characteristic for the charging device 260. In another alternative embodiment, the user input stage 264 can be a slide switch that can be used to select one of several different settings associated with different locations. Other devices that are appropriate to receive user input can also be used to implement the user input stage 264, such as, for example, a touch screen, or a Bluetooth or WIFI interface.

The visual location indicator 266 is connected to the micro-controller 262 and receives the location indication signal from the micro-controller 262 which indicates the location setting of the user input stage 264. This allows the visual location indicator 266 to provide a visual cue to the user as the user sets, or after the user sets, the location characteristic for the charging device 260. The visual location indicator 266 can include a monochrome LED array and the number of LEDs that light up correspond to the location characteristic of the charging device 260. Alternatively, the visual location indicator 266 can include a multi-color LED array that displays a color that is associated with a location. For example, the visual location indicator 266 can display red to indicate that the location characteristic is set to the home location, green to indicate that the location characteristic is set to the office location, and blue to indicate that the location characteristic has been set to the vehicle location. In another embodiment, the visual location indicator 266 can be a numeric display, such as an LED display or LCD display, that displays a numerical character (i.e. 1, 2, etc.) or a number of objects, such as squares, that represents a location. For example, the visual location indicator 266 can display the number "1" or one object to indicate that the location characteristic is set to the home location, the number "2" or two objects to show that the location characteristic has been set to the office location, and the number "3" or three objects to indicate that the location characteristic is set to the vehicle location. Alternatively, when a display is used for the visual location indicator 266, the display can show an icon that represents the location such as a little house, desk or car for the home, office and vehicle locations respectively. In another alternative, the visual location indicator 266 can flash a certain number of times to indicate its location characteristic.

The current sensing stage 268 is connected to the connector stage 272 and the micro-controller 262. The current sensing stage 268 includes circuitry which is used to detect whether the mobile device 100 is connected to the charging device 260 by measuring the amount of current that is drawn through the connector stage 272. The current sensing stage 268 provides the current measurement in a current sense signal to the micro-controller 262 which then determines whether the charging device 260 is connected to a mobile device 100 by comparing the magnitude of the current sense signal to a threshold value. For example, current in excess of 1.5 to 3 mA indicates that the mobile device 100 is connected to the charging device 260.

The power supply stage 270 is connected to an external power source 278 through a power adapter 276. The power supply stage 270 is also connected to the current sensing stage 268. The power supply stage 270 includes circuitry with components for providing a power supply signal to the connector stage 272 on a controllable basis to encode the location characteristic in the power supply signal. The power supply stage 270 receives a location control signal from the micro-controller 262 when the mobile device 100 is first operably connected to the charging device 260 as well as when the user changes the location characteristic of the charging device 260 while the mobile device 100 is operably connected to the charging device 260. This allows the micro-controller 262 to control the power supply stage 270 to generate pulse information in the power signal based on a number of techniques, such as the presence or absence of pulses, the number of pulses or the duration of a pulse, as is described in more detail below in conjunction with FIGS. 10A-10C. In some cases, the external power source is an AC power source which the power adapter 276 converts to DC power for provision to the power supply stage 270. In other cases, other types of power sources, including DC power sources, may be used as appropriate. The external power source 278 can vary depending on the location of the charging device 260. For instance, when the charging device 260 is in an office or home location, the external power source 278 can be a wall socket or a power bar. Alternatively, when the charging device 260 is in a vehicle location, the external power source 278 can be an electrical outlet or cigarette lighter outlet in the vehicle.

The connector stage 272 is connected to the power supply stage 270 and the current sensing stage 268. The connector stage 272 can include exposed power connection points (i.e. a spring-based connection which are sometimes referred to as pogo-pins), a micro-USB connector, a mini-USB connector or a USB connector that can be physically inserted into a corresponding port on the mobile device 100. The connector stage 272 receives the power supply signal from the power supply stage 270 and preprocesses this signal as required to create a power signal that is sent to the mobile device 100.

Figure 8:
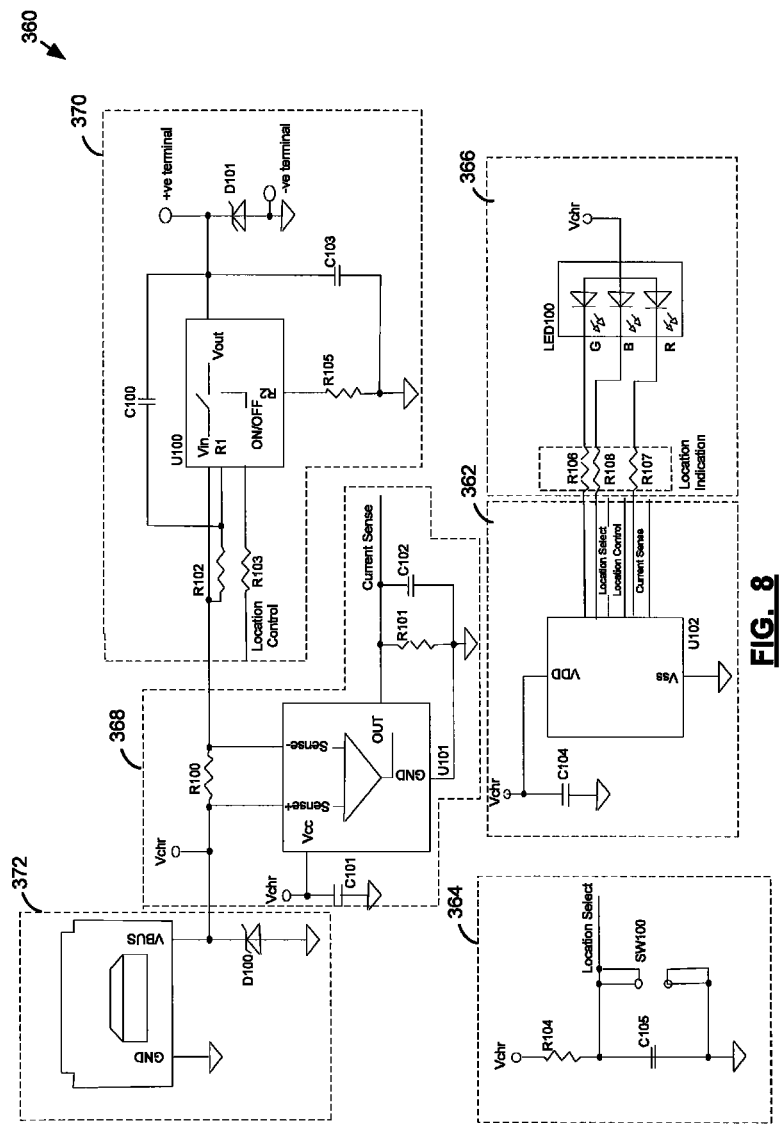
FIG. 8 is a circuit schematic of an example embodiment of the charging device.

Referring now to FIG. 8, shown therein is a circuit schematic of an embodiment of the charging device 360 including a microprocessor 362, a user input stage 364, a visual location indicator 366, a current sensing stage 368, a power supply stage 370 and a connector stage 372. It should be understood that this embodiment is shown as an example and modifications can be made to this embodiment while providing the required functionality.

The user input stage 264 includes a push button switch SW100 and an RC stage comprising a linear connection of resistor R104 and capacitor C105. The switch SW100 is connected in parallel with the capacitor C105. The user presses the switch SW100 a number of times to set the location characteristic of the charging device 360. The values of the resistor R104 and the capacitor C105 are selected to provide an appropriate time constant for the switch SW100 which affects how fast the user can generate distinct pulses from the switch SW100. The location select signal results from the pulses that are generated when the switch SW100 is pushed by the user. The RC stage is biased with supply voltage Vchr.

The micro-controller 362 includes a capacitor C104 to smooth out any spikes in the supply voltage Vchr that provides power to the micro-controller 362. The micro-controller 362 receives the location select signal from the user input stage 364 and provides the location indication signal along pins 2, 3 and 6 to the visual location indicator 366. The micro-controller 362 also receives the current sense signal from the current sensing stage 368 and provides the location control signal to the power supply stage 370. The micro-controller 362 can be a flash-based micro-controller that is programmed with firmware to control the operations of the charging device 360 including processing various signals to generate other signals as described herein.

The visual location indicator 366 includes an input stage of resistors R106 to R108 that connect an LED stage LED100 to the micro-controller 362 and receive the location indication signal. The LED stage LED100 is biased by the supply voltage Vchr and can be turned on in various combinations to provide about eight different colors to show the user what the location setting is for the charging device 360 based on the values of the voltages provided from the micro-controller 362. The micro-controller 362 can also be adapted to flash the LED stage LED100 while the user is resetting the location characteristic of the charging device 360 (it should be noted that, in general, any element that is "adapted to" or "configured to" perform a function is capable of carrying out that function).

The current sensing stage 368 includes an amplifier U101, a resistor R100 connected across the inputs of the amplifier U101, an RC filter having resistor R101 and capacitor C102 connected in parallel to the output of the amplifier U101 and a smoothing capacitor C101 connected in parallel to the voltage supply of the amplifier U101. One input pin of the amplifier U101 is connected to the connector stage 272 and the other input pin of the amplifier U101 is connected to the power supply stage 370. The resistor R100 is used to measure the current that is drawn through the connector stage 372. The magnitude of the current measurement varies depending on whether the charging device 360 is connected to the mobile device 100. The output of the amplifier U101 is connected to the micro-controller 362 and provides the current sense signal.

The power supply stage 370 includes a switch U100 having bias resistors R102 and R103 connected to pin R1 and an on/off input pin. A feedback capacitor C100 is connected between the output of switch U100 and pin R1. The capacitor C100 and the resistor R102 control the current rise in the output signal of the switch U100. An RC stage including resistor R105 and capacitor C103 is connected between the output and pin R2 of the switch U100. The output of the switch U100 is connected to positive and negative terminals which are used to connect to the power adapter 276. A diode D101 is connected in a reverse-biased fashion between these terminals to provide electrical isolation between these terminals. The values of the capacitors and resistors in the power supply stage 370 are used to reduce the overall impedance of this stage such that the magnitude of the power supply signal produced at the output of the switch U100 is at least 4.3 or 4.4 V. The power supply signal is provided as Vchr to the various components of the charging device 360 to power these components. The values for the resistor R105 and capacitor C103 are selected to control the inrush current as specified in the datasheet corresponding to the switch U100.

The location control signal produced by the micro-controller 362 is provided to the input ON/OFF of the switch U100 such that the output of the switch U100 is connected to the connector stage 372 through resistors R102 and R100 intermittently to encode the location characteristic of the charging device 360 in the power supply signal. In other words, the micro-controller 362 can pulse the power line to include pulse information within the power signal generated by the charging device 360 to indicate the location characteristic of the charging device 360. The mobile device 100 is adapted to interpret the pulsed power signal to determine the location characteristic of the charging device 360. The micro-controller 362 can turn the switch U100 on and off to encode the location characteristic as a digital value based on a series of 1's and 0's, or as a pulse of varying duration or as a certain number of pulses as described with respect to FIGS. 10a-10c.

The connector stage 372 comprises a spring-loaded connector with VBUS and GND lines. The internal end of the VBUS line is connected such that it receives the power supply signal from the power supply stage 370 through the current sensing stage 368. This power supply signal is then provided as the power signal by the external end of the VBUS line to the corresponding pin in the battery interface 132 of the mobile device 100. The internal VBUS line is also connected to a reverse-biased diode D100 to provide electrical isolation to ground. The internal GND line is connected to ground while the external GND line is connected to the corresponding pin in the battery interface 132 of the mobile device 100.

Figure 9:
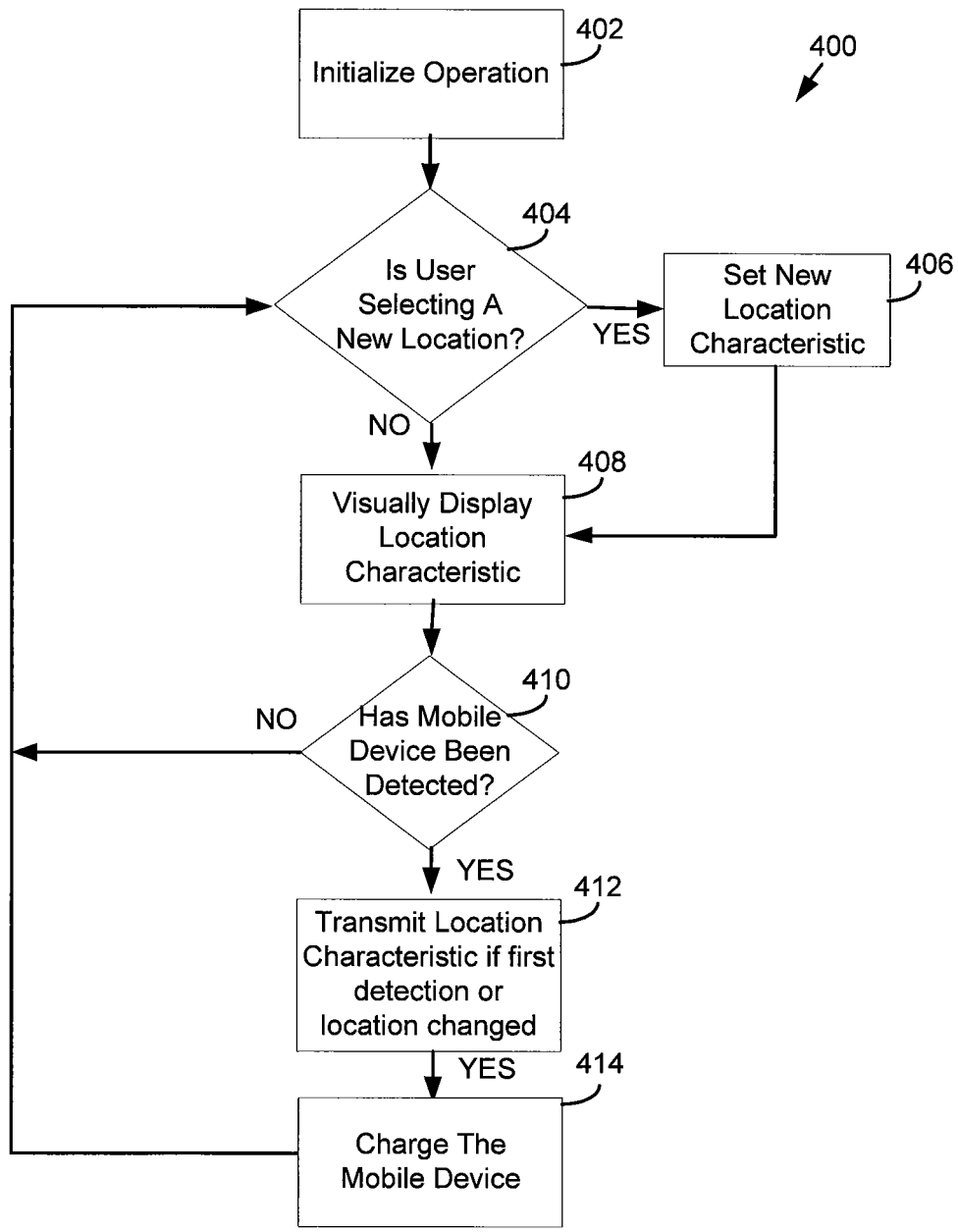
FIG. 9 is a flowchart of an operational method followed by the charging device.

Referring now to FIG. 9, shown therein is a flowchart of an operational method 400 that is followed by the charging device 260. At step 402, the charging device 260 performs initialization of its registers and variables used in the firmware. At step 404, the method 400 checks to see if a user is selecting a new location for the charging device 260 by interacting with the user input stage 264. If so, the method 400 moves to step 406 at which point a new value is set for the location characteristic. If not, the previous value is used for the location characteristic or a default value is used for the location characteristic if it was never set by the user. At step 408, the charging device 260 displays the value of its location characteristic via the visual location indicator 266. At step 410, the method 400 checks to see if the charging device 260 is operably connected to the mobile device 100 by measuring the current as described previously. If not, the method 400 goes to step 404 so that the method can continually check if the user enters a new location for the charging device 260 or the charging device 260 becomes operably connected to the mobile device 100. If step 410 is true, the method 400 moves to step 412 at which point the charging device 260 transmits its location characteristic to the mobile device 100 if it is the first detection that the charging device 260 is operably connected to the mobile device 100 or if the user has just changed the location characteristic of the charging device 260. There should be a small delay before the location characteristic is transmitted so that the mobile device 100 has enough time to receive the location characteristic from the charging device 260. This also allows for steady state voltage levels to be reached after the mobile device 100 and the charging device 260 are operably connected to one another which avoids any glitches in the communication between these two devices. This delay may be at least 15 ms and may be as long as 100 ms depending on the circuitry that is being used. The method 400 then moves to step 414 at which point the charging device 260 begins charging the mobile device 100. The method 400 then goes to step 404. It should be noted that the micro-controller 262 can enter a sleep mode and wake up periodically to perform the checks in steps 404 and 410.

Figure 10A:
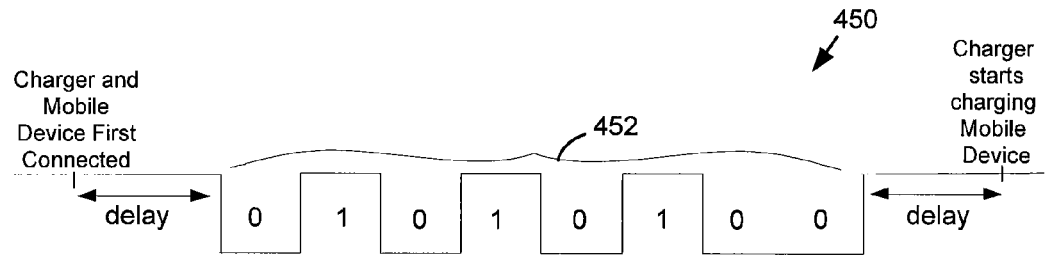
FIGS. 10a-10c show illustrations of example power signals that are generated by the charging device described herein to encode a location characteristic.

Referring now to FIG. 10a, shown therein is an illustration of an example of a power signal 450 that has a location characteristic 452 (i.e. characteristic information) encoded within it based on pulse information within the power signal. The power signal can be used by the charging device to transmit its location information to the mobile device 100. In this case, the location characteristic 452 is encoded as a digital sequence in the power signal 450. There is a delay after the charging device 260 and the mobile device 100 are first operably connected as explained previously. After the delay, the location characteristic 452 for the charging device 260 is encoded via a digital sequence into the power signal 450 by using at least one of pulses or the absence of pulses in the pulse information, which can be generated when the micro-controller 262 pulses the power supply stage 272. A digital 0 bit is encoded by pulling the power signal 450 low and a digital 1 bit is encoded by pulling the power signal 450 high. The pulse length can be set based on the ability of the mobile device 100 to detect pulses. For example, some mobile devices are fast enough to detect pulses that have durations of about 20 ms, while others are only fast enough to detect pulses that have durations of about 40 ms. Accordingly, the pulse duration can be set to 50 ms to be conservative. The length of the location characteristic 452 is a predetermined time duration so that the mobile device 100 knows how many bits will be transmitted in the power signal 450. The number of bits that are sent depend on the amount of information in the location characteristic. For instance, if there are 8 possible locations then 3 bits can be transmitted. In this example, an 8 bit sequence "01010100" is sent. At the end of the predetermined time duration, the charging device 260 pulls the power signal 450 back high so that it can start charging the mobile device 100. There can be another slight delay as the mobile device 100 prepares to be charged. The mobile device 100 then acts on the location information as described previously.

Figure 10B:
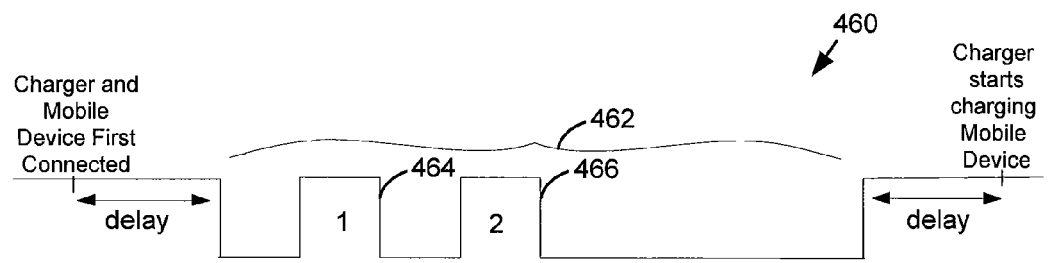

Referring now to FIG. 10b, shown therein is an illustration of another example of a power signal 460 that has a location characteristic 462 encoded within it based on pulse information within the power signal. In this case, the location characteristic 462 is encoded as a number of pulses 464 and 466 in the pulse information of the power signal 450. In a more general sense, one pulse can be transmitted to communicate a first location, two pulses can be transmitted to communicate a second location, and so on and so forth. The duration of the pulses and the length of the location characteristic 462 are set as described previously. In this case, the mobile device 100 is configured to count the number of pulses in the predetermined time period to obtain the location information for the charging device 260 and then take the appropriate action.

Figure 10C:
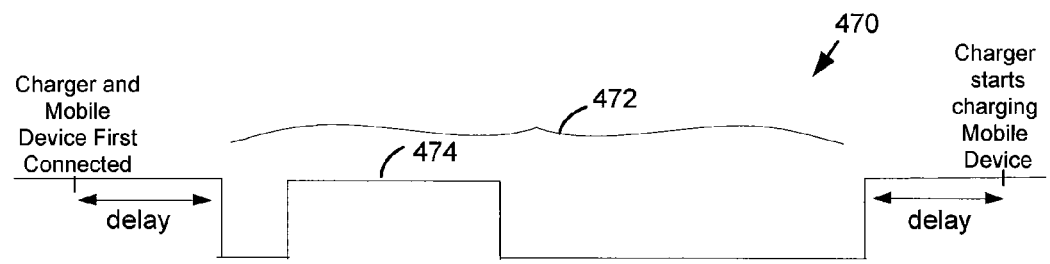

Referring now to FIG. 10c, shown therein is an illustration of another example of a power signal 470 that has a location characteristic 472 encoded within it based on pulse information within the power signal. In this case, the location characteristic 472 is encoded as a pulse 474 having a certain length or duration in the pulse information based on the characteristic information. For example, assuming a resolution of 40 ms, a pulse length of 40 ms can represent a first location, a pulse length of 80 ms can represent a second location, and so on and so forth up until a maximum time duration. In this case, the mobile device 100 is configured to determine the pulse length to obtain the location information for the charging device 260 and then take the appropriate action.

It should be noted that FIGS. 10a-10c depict instances in which the location characteristic is transmitted when the charging device 260 and the mobile device 100 are first operably connected with one another. Thereafter, when the user changes the location characteristic while the charging device 260 is charging the mobile device 100, the charging device 260 is configured to stop charging the mobile device 100 and send the new location information to the mobile device 100. In this case, the mobile device 100 will detect that the charging has stopped prematurely, since the mobile device 100 has not yet been fully charged, and will expect new location information to be transmitted. Once this information has been transmitted, the charging device 260 will continue to charge the mobile device 100. Furthermore, it should be noted that other types of waveforms may also be used with this technique to encode the location characteristic.

This particular technique of sending the location characteristic over the power signal can also be referred to as power-cycling. This technique of communicating location information is beneficial compared to using a conventional USB identification protocol since this technique can be used in cases where there are no data lines over which to communicate. In addition, the USB identification protocol typically requires at least 60 or 70 bytes to be transmitted, whereas this power-cycling technique can transmit the location information in less than 1 byte in some cases, depending on how the location characteristic is defined. By transmitting a smaller amount of information, it can take a much smaller amount of time for the mobile device 100 to identify its location and make the appropriate changes to its settings and run the appropriate software applications, which results in a better user experience.

In an alternative embodiment, unique serial information (such as a serial number or other uniquely identifying message or information) can be assigned to the charging device during production. When the mobile device 100 is operably connected with the charging device, the charging device can use the power cycling technique to transmit the serial information using 1's and 0's (as in the case of FIG. 10*a*) to the mobile device 100. The user can then use the location-based configuration module 138 to assign a location to the serial information as well as specify the corresponding applications to be executed and items to be set by the mobile device 100 when it is operably connected to this particular charging device. In this case, there is no need to incorporate the user input stage 264 or the visual location indicator 266 in the charging device 260.

In another alternative, this power-cycling technique can be combined with the USB ID protocol. For example, the connector stage can be provided with multiple types of attachments including a straight pass-through connector with no data lines or a USB-based connector, such as a µUSB connector, a mini-USB connector or a USB connector, that can support the USB ID protocol. Accordingly, when the charging device is connected to mobile devices that have a USB port, then the USB-based connector can be used along with the USB ID protocol to transmit the location information of the charging device. Alternatively, when the charging device is connected to mobile devices that do not have a USB port, then the straight pass-through connector can be used along with the power-cycling technique of transmitting the location information of the charging device.

In another alternative, this power-cycling technique can be combined with the NFC communication protocol. For example, the charging device can also have an NFC tag that receives the location information of the charging device from the micro-controller of the charging device. When the charging device is charging a mobile device that also has an NFC tag, then after the mobile device and the charging device detect one another according to the NFC protocol, the location information can be transferred from the charging device to the mobile device using the NFC protocol. However, in cases where the mobile device does not have an NFC tag, the charging device can transmit the location information over the power signal as described herein. In either case, the charging device then charges the mobile device and the mobile device configures its operations and settings based on the location information of the charging device.

In another alternative, this power-cycling technique can be used when the power signal is transferred wirelessly between the charging device and the mobile device.

Implementation of one or more embodiments described herein may realize one or more advantages, some of which have been mentioned already. For example, the techniques for recognition by power-cycling can supplant, supplement, back up or work in concert with other recognition techniques. As already indicated, the techniques may be applied in situations in which conventional communication between a mobile device and a peripheral device may be impaired or unavailable. Recognition may be performed automatically and location-based configuration may be conveniently carried out without user intervention after the location information has been configured for the peripheral device. Further, the components used for recognition by power-cycling are generally small and lightweight, and in some cases the components may be present for reasons besides power-cycling. Components that are small and lightweight are often advantageous for peripheral devices and mobile devices, including mobile devices that are handheld (sized and shaped to be held or carried in a human hand). In addition, the techniques described herein are adaptable to work with a variety of mobile devices and peripheral devices, and the techniques also support customization as desired by a user.

In addition, the power-cycling techniques described herein may require less data compared to other identification methods such as USB identification, and so these power-cycling techniques may be communicated much quicker and may require less power than other identification techniques. Furthermore, the power-cycling technique itself is quite flexible as different types of waveforms can be used to communicate information such that a particular type of waveform may be selected which will result in the most efficient use of power-cycling depending on how many alternatives are possible for the characteristic information. For instance, if only four different locations are possible then the power signal 460 may be used in power-cycling, whereas if there are 16 different locations then the power signal 450 may be used in power-cycling. Furthermore, power signal 450 may be shortened to have a fewer number of bits depending on the amount of information to be conveyed. The charging devices and associated methods described herein are also very user-friendly as they are easy to use and configure. Furthermore, the power-cycling technique can be used with a variety of peripheral devices ranging from small hand-held devices to larger devices.

While the embodiments discussed herein have described that location information can be transmitted between the charging device 260 and the mobile device 100, the method of communication over a power signal can be more broadly considered to be a method of communicating characteristic information that encodes information about a characteristic (e.g. location, serial information, etc.) of a peripheral device, between a peripheral device, such as a charging device, and another electronic device. The electronic device can then determine a characteristic of the peripheral device based on the characteristic information.

Accordingly, in one aspect, at least one example embodiment described herein, there is provided a method of providing a characteristic of a peripheral device to an electronic device, wherein the method comprises obtaining characteristic information about the peripheral device; encoding the characteristic information in a power signal at the peripheral device; and sending the power signal to the electronic device.

The method can further comprise encoding the characteristic information based on pulse information within the power signal.

In at least some cases, the characteristic information comprises location information for the peripheral device.

In at least some cases, the characteristic information comprises serial information for the peripheral device.

In at least some cases, the method further comprises providing at least one of pulses and absences of pulses in the pulse information to encode a digital sequence that represents the characteristic information.

In at least some cases, the method further comprises providing a number of pulses in the pulse information, wherein the number of pulses encodes the characteristic information.

In at least some cases, the method further comprises providing a single pulse with a duration in the pulse information and setting the duration of the single pulse based on the characteristic information.

In at least some cases, the method further comprises providing a visual indication of the characteristic information at the peripheral device.

In at least some cases, the method further comprises encoding the characteristic information in the power signal after detecting that the peripheral device is operably connected to the electronic device for the first time or when the characteristic information of the peripheral device is changed after the peripheral and electronic devices are operably connected.

The power signal is transferred via a wired connection or a wireless connection between the peripheral device and the electronic device.

In another aspect, according to at least one example embodiment described herein, there is provided a peripheral device that provides a power signal to charge an electronic device. The peripheral device comprises a power supply stage adapted to provide a power supply signal; a connector stage adapted to operably connect the peripheral device with the electronic device and provide the power signal based on the power supply signal; and a micro-controller connected to the power supply stage, the micro-controller being adapted to obtain characteristic information about the peripheral device and encode the characteristic information in the power supply signal.

In at least some cases, the micro-controller is adapted to control the power supply stage to generate pulse information to encode the characteristic information.

In at least some cases, the micro-controller is adapted to control the power supply stage to generate the pulse information to encode a digital sequence comprising at least one of pulses and absences of pulses to encode the characteristic information.

In at least some cases, the micro-controller is adapted to control the power supply stage to generate a number of pulses in the pulse information, wherein the number of pulses encodes the characteristic information.

In at least some cases, the micro-controller is adapted to control the power supply stage to provide a single pulse with a duration in the pulse information, wherein the duration of the single pulse is based on the characteristic information.

In at least some cases, the peripheral device further comprises: a visual location indicator connected to the micro-controller, the visual location indicator being adapted to provide a visual indication of the characteristic information; and a user input stage configured to allow a user to input a characteristic of the peripheral device.

In at least some cases, the peripheral device further comprises a current sensing stage connected to the connector stage and the micro-controller, the current sensing stage being adapted to measure a current of the connector stage, and wherein the micro-controller is further adapted to detect when the peripheral and electronic devices are operably connected based on the measured current and to instruct the power supply stage to encode the characteristic information in the power signal after detecting that the peripheral device is operably connected to the electronic device for the first time or when the characteristic information of the peripheral device is changed after the peripheral and electronic devices are operably connected.

In another aspect, according to at least one example embodiment described herein, there is provided a mobile device comprising a microprocessor configured to control the operation of the mobile device; a memory device connected to the microprocessor, the memory device comprising software instructions to implement an operating system and software applications which provide various functions for the mobile device when executed by the microprocessor; a display connected to the microprocessor, the display adapted to provide visual information to a user of the device; an interface connected to the microprocessor, the interface adapted to receive a power signal from a charging device, wherein, the microprocessor is configured to detect characteristic information in the power signal regarding a characteristic of the charging device and to configure the operation of the mobile device based on the characteristic.

In at least some cases, the microprocessor is configured to detect the characteristic information based on pulse information in the power signal.

In another aspect, according to at least one example embodiment described herein, there is provided a method for controlling the operation of a mobile device wherein the method comprises: detecting an operable connection between the mobile device and a charging device; detecting characteristic information of the charging device in a power signal received from the charging device; and performing at least one of executing applications and configuring settings of the mobile device based on the characteristic information.

In at least some cases, the method comprises detecting the characteristic information based on pulse information in the power signal.

It should be understood that various modifications can be made to the embodiments described and illustrated herein, without departing from the embodiments, the general scope of which is defined in the appended claims.

The invention claimed is:

1. A method of providing characteristic information of a peripheral device to an electronic device, wherein the method comprises:
   detecting whether a user is selecting the characteristic information for the peripheral device at a user input stage of the peripheral device;
   if the user is selecting the characteristic information at the user input stage of the peripheral device, setting the characteristic information of the peripheral device to identify location information provided by the user at the user input stage of the peripheral device, the location information being used to modify a configuration of the electronic device;
   obtaining the characteristic information about the peripheral device;

detecting whether the peripheral device has just been operably connected to the electronic device;

encoding the characteristic information in a power signal at the peripheral device;

after a first delay period, sending the power signal with the encoded characteristic information to the electronic device; and after a second delay, sending the power signal for charging the electronic device, wherein the first delay period is between the detecting of the peripheral device having just been operably connected to the electronic device and the sending of the power signal with the encoded characteristic information to the electronic device, and the second delay period is after the sending of the power signal with the encoded characteristic information to the electronic device and before the sending of the power signal for charging the electronic device.

2. The method of claim 1, wherein the method further comprises encoding the characteristic information based on pulse information, within the power signal.

3. The method of claim 2, wherein the characteristic information comprises serial information for the peripheral device.

4. The method of claim 2, wherein the method further comprises providing at least one of pulses and absences of pulses in the pulse information to encode a digital sequence that represents the characteristic information.

5. The method of claim 2, wherein the method further comprises providing a number of pulses in the pulse information, wherein the number of pulses encodes the characteristic information.

6. The method of claim 2, wherein the method further comprises providing a single pulse with a duration in the pulse information and setting the duration of the single pulse based on the characteristic information.

7. The method of claim 1, wherein the method further comprises providing a visual indication of the characteristic information at the peripheral device.

8. The method of claim 1, wherein the method further comprises encoding the characteristic information in the power signal after detecting that the peripheral device is operably connected to the electronic device for the first time or when the characteristic information of the peripheral device is changed after the peripheral and electronic devices are operably connected.

9. The method of claim 1, wherein the power signal is transferred via a wired connection or a wireless connection between the peripheral device and the electronic device.

10. The method of claim 1, wherein the first delay period is different from the second delay period.

11. The method of claim 1, wherein the second delay period is subsequent to the first delay period.

12. A peripheral device that provides a power signal to charge an electronic device, wherein the peripheral device comprises:

a power supply stage adapted to provide a power supply signal;

a connector stage adapted to operably connect the peripheral device with the electronic device and provide the power signal based on the power supply signal;

a user input stage configured to allow a user to input location information of the peripheral device; and a micro-controller connected to the power supply stage, the micro-controller being adapted to detect when the peripheral device and the electronic device have just been operably connected, to determine if a user is providing location information at the user input stage of the peripheral device about the peripheral device, and if the user is providing the location information at the user input stage of the peripheral device, to set characteristic information about the peripheral device to identify the location information provided by the user, to obtain the characteristic information about the peripheral device, to encode the characteristic information in the power supply signal, to send the power supply signal with the encoded characteristic information to electronic device after a first delay period, and to send the power supply signal for charging the electronic device after a second delay period, wherein the location information of the peripheral device is used to modify a configuration of the electronic device, wherein the first delay period is between the detecting of the peripheral device having just been operably connected to the electronic device and the sending of the power signal with the encoded characteristic information to the electronic device, and the second delay period is after the sending of the power signal with the encoded characteristic information to the electronic device and before the sending of the power signal for charging the electronic device.

13. The peripheral device of claim 12, wherein the micro-controller is adapted to control the power supply stage to generate pulse information to encode the characteristic information.

14. The peripheral device of claim 12, wherein the characteristic information comprises serial information for the peripheral device.

15. The peripheral device of claim 13, wherein the micro-controller is adapted to control the power supply stage to generate the pulse information to encode a digital sequence comprising at least one of pulses and absences of pulses to encode the characteristic information.

16. The peripheral device of claim 13, wherein the micro-controller is adapted to control the power supply stage to generate a number of pulses in the pulse information, wherein the number of pulses encodes the characteristic information.

17. The peripheral device of claim 13, wherein the micro-controller is adapted to control the power supply stage to provide a single pulse with a duration in the pulse information, wherein the duration of the single pulse is based on the characteristic information.

18. The peripheral device of claim 12, wherein the peripheral device further comprises:

a visual location indicator connected to the micro-controller, the visual location indicator being adapted to provide a visual indication of the characteristic information; and the user input stage configured to allow the user to input a characteristic of the peripheral device.

19. The peripheral device of claim 12, wherein the peripheral device further comprises a current sensing stage connected to the connector stage and the micro-controller, the current sensing stage being adapted to measure a current of the connector stage, and wherein the micro-controller is further adapted to detect when the peripheral and electronic devices are operably connected based on the measured current and to instruct the power supply stage to encode the characteristic information in the power signal after detecting that the peripheral device is operably connected to the electronic device for the first time or when the characteristic information of the peripheral device is changed after the peripheral and electronic devices are operably connected.

20. The peripheral device of claim 12, wherein the power signal is transferred via a wired connection or a wireless connection between the peripheral device and the electronic device.

21. The peripheral device of claim 12, wherein the first delay period is different from the second delay period.

22. The peripheral device of claim 12, wherein the second delay period is subsequent to the first delay period.

\* \* \* \* \*